United States Patent [19]

Chen

[11] Patent Number: 5,288,104
[45] Date of Patent: Feb. 22, 1994

[54] BUFFERING SAFE DEVICE IN VEHICLES

[76] Inventor: Johnny Chen, 10F-1, No. 149, Keelung Road, Sec. 1, Taipei, Taiwan

[21] Appl. No.: 973,971

[22] Filed: Nov. 9, 1992

[51] Int. Cl.$^5$ .............................................. B60R 21/18
[52] U.S. Cl. ................................... 280/733; 280/734; 280/806
[58] Field of Search .................... 280/733, 730 R, 735, 280/734, 736, 806; 200/61.53; 180/282

[56] References Cited

U.S. PATENT DOCUMENTS

| | | | |
|---|---|---|---|
| 3,706,463 | 12/1972 | Lipkin | 280/733 |
| 3,723,205 | 3/1973 | Scheffee | 280/741 |
| 3,749,282 | 7/1973 | Day et al. | 280/734 |
| 5,062,662 | 11/1991 | Cameron | 280/733 |
| 5,104,145 | 4/1992 | Föhl | 280/734 |
| 5,162,006 | 11/1992 | Yandle, II | 280/733 |
| 5,184,845 | 2/1993 | Omura | 280/739 |

Primary Examiner—Margaret A. Focarino
Assistant Examiner—Paul Dickson
Attorney, Agent, or Firm—Pro-Tector International

[57] ABSTRACT

A buffering safe device for use in vehicles, suits a seat belt in a vehicle, can form a inflated cushion layer to protect the human body, comprises an elongate hollowed box which has an openable lid and has a folded air bag inside thereof; on both ends of the box are hook portions for connecting the box to a surface of a seat belt; on one end of the box is a inflator connecting pipe, one end thereof being connected with an air bag in the box, while the other end being connected with an inflating device via a flexible and elastic hose; therefore, the box is installed directly on the seat belt while the inflating device is installed at one appropriate position in the vehicle, such that the buffering safe device can be installed on any seat in any vehicle.

2 Claims, 10 Drawing Sheets

BUFFERING SAFE DEVICE IN VEHICLES

BACKGROUND OF THE INVENTION

The present invention relates to a buffering safe device used in vehicles; and especially to a buffering safe device which is particularly suitable to be installed on a seat belt in a car, and which can form a buffering cushion layer in front of a human body.

According to the automobile safety tests of the Department of Traffic (DOT) of America, the model of human body (DUMMY) with a seat belt tied on it in the condition where the tested car runs at a speed of 50 km/hr. and the acceleration of gravity almost reaches 50 G, will show a serious damage wherein the head and the neck thereof being bending forward and rushing on the chest thereof. In such situation, if an air cushion layer is shaped in front of the chest, the damage will be effectively avoided.

Accordingly, part of automobiles on the market are equiped with a buffering safe device, such as the well-known safe air bag; this air bag can expand in due time when there occurs an accident of impact, such that the human body rushing forward can collide with the air bag having been expanded, thus the damage to human body can be avoided.

However, the existing air bags are mostly installed in the interior of the steering wheel assembly; in this case, automobiles of different brands without air bag safe devices for example need redesign in the related structures of the steering wheel to put the air bag therein. This of course creates bother to the manufacturers, because it involves the more complicated changes of design as well as of the production lines of the factories. This is why most of the cars on the market are not assembled with such a buffering safe device although the air bag is well-known as having the life protecting function.

Furthermore, the existing cars running on the roads are totally not possible to have the air bag safe device installed in the steering wheel assembly for the reason of diversification of the car serieses made from the different factories, i.e., it is difficult to install such a buffering safe device onto the car already out from the factory and without such safe device.

Besides, the existing air bags are only available on the steering wheel, and upon an accident of impact, there is no any such protecting safe device at the front passenger's seat and/or back seats for children etc.; yet the conventional air bag is obviously not available to other passengers in the car.

SUMMARY OF THE INVENTION

Accordingly, the present invention provides a buffering safe device which comprises an elongated hollowed box, a folded air bag is preinstalled in the box, on both ends thereof are hook portions for hanging which are used to connect the whole air bag to the seat belt; the box comprises a connector which has a flexible and elastic strip to be connected to a mechanical or electrical inflating device, such that the device can function to inflate the air bag when an impact occurs, and the lid of the box can be opened by the expanding force to provide protection in front of the human body; Such buffering safe device can be added to various seat belts of various cars at any time, this is primary motive of the present invention.

BRIEF DESCRIPTION OF THE DRAWINGS

The novelty and other features of the present invention will be apparent when read the detailed description of the preferred embodiment of the present invention in reference to the drawings. And in the drawings.

DETAILED DESCRIPTION OF THE PREFERRED EMBODIMENT

Figure 1:
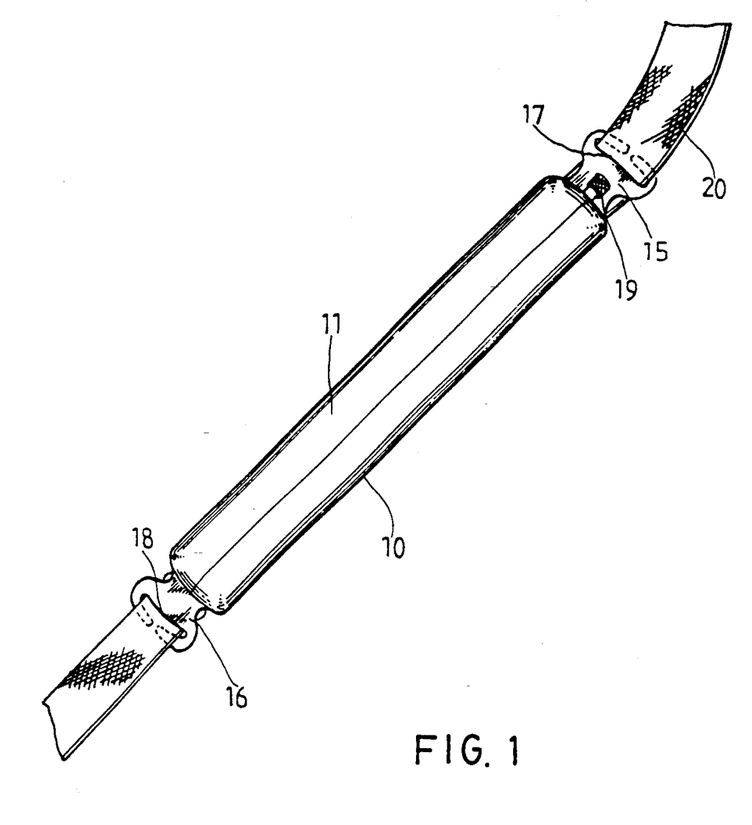
FIG. 1 is a stereoscopic view of the preferred embodiment of the present invention installed on a seat belt.
Figure 2:
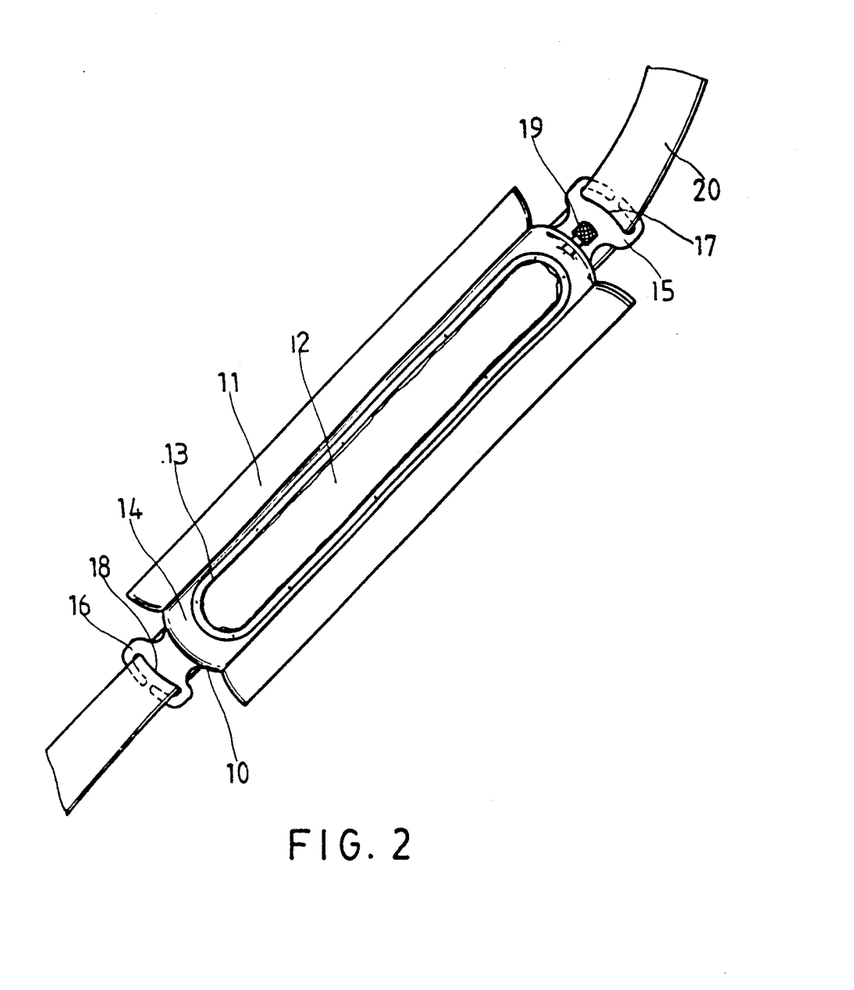
FIG. 2 is a stereoscopic view similar to that of FIG. 1, showing the lid of the box having been opened.
Figure 3:
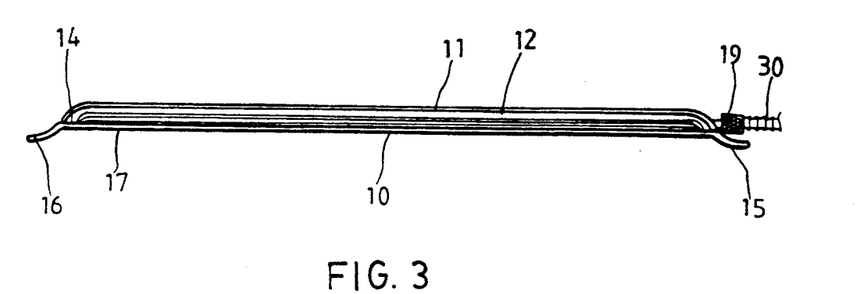
FIG. 3 is a sectional view of the embodiment of the present invention.

Referring to FIGS. 1 and 3, the present invention is provided with a hollowed box 10, the box 10 may be in an elongate shape and includes a lid 11 which can be forced to be openned. The lid 11 may be of a single sheet which is hinged on one side thereof, or may be of twin sheets which each can be openned at the mid point of the box 10. A folded air bag 12 is preinstalled in the box 10, the bottom end of the air bag 12 may be fixed by a fixing piece 13 to the interior surface 14 of the box 10 as shown in FIG. 2, the remaining bag portion is folded from the nearer part to the farther part thereof as relative to the surface 14.

On both ends of the box 10 there may be provided with hook portions 15, 16. In this embodiment, these hook portions 15, 16 may be arranged to be lower than the bottom of the box 10, and there are grooves 17, 18 provided in them for piercing of the seat belt 20 to locate the box 10 thereon.

An inflator connecting pipe 19 is provided on one end of the box 10 and on a position slightly above the hook portion 15, with one end of the connecting pipe 19 extending into the box 10 for connecting with the air bag 12, and with the other end thereof being revealed.

Figure 5:
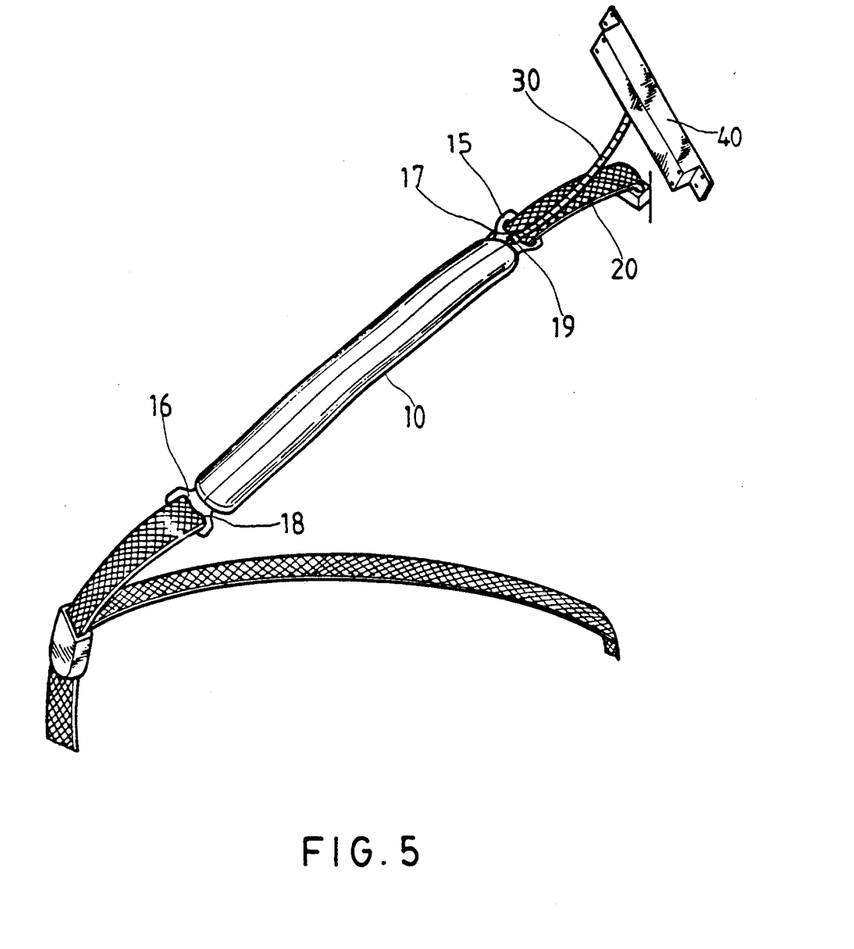
FIG. 5 is a schematic view of the embodiment of the present invention installed with a mechanical inflating device.

Referring to FIG. 5, the present invention may be connected to a inflating device 40 through a flexible and elastic hose 30 after installation thereof. The flexible and elastic hose 30 is connected on one end thereof to one end of the inflator connecting pipe 19, while the other end thereof is connected to the outlet of the inflating device 40.

Figure 6:
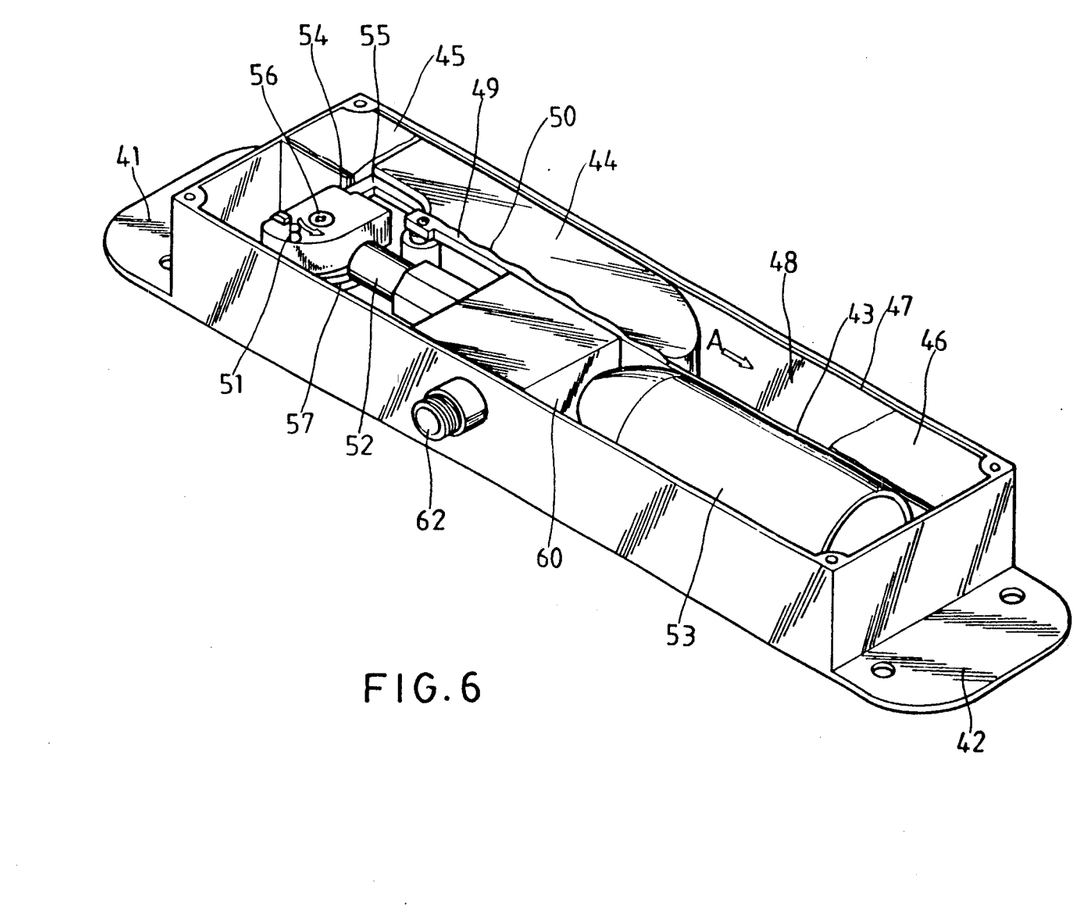
FIG. 6 shows the interior structure of the mechanical inflating device of FIG. 5.
Figure 7:
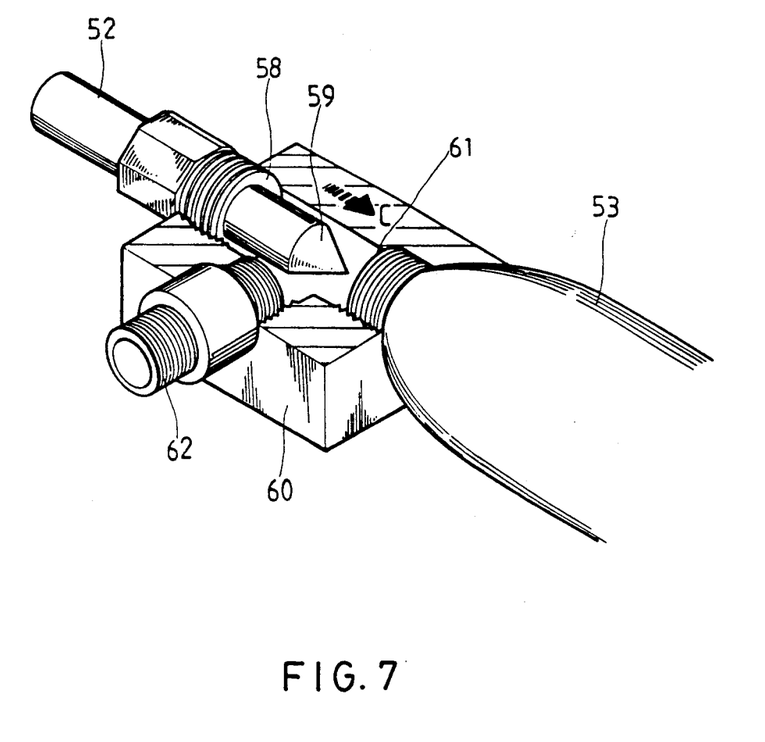
FIG. 7 is a detailed drawing of a triggering device in the structure of FIG. 6.

Now referring specifically to FIGS. 6, 7, the inflating device 40 is also presented as a box, on both ends thereof there are extended fixing tablets 41, 42; while a middle separating plate 43 inside the box 40 divides it into a left and a right spaces. A heavy block 44 is provided in the right space, the upper and lower ends and the right side innerface thereof are all provided with flexible as well as elastic cushion layers 45, 46, 47. The total length of the heavy block 44 is set to be shorter than that of the right space, so as to form a sliding space 48 of a suitable length. The left side inner face of the right space is preinstalled with a pressure strip 49 whereon an abutting area 50 against the heavy block 44 can have a slightly corrugated shape. The left space is provided sequential with an eccentric block 51, a triggering device 52 and a storing barrel 53 for a kind of gas.

The said eccentric block 51 has a notch portion 54 at one conner thereof, the notch portion 54 is abutted against a stop clip 55 provided on the end of the left side of the heavy block 44. The eccentric block 51 is fixed in position by a central supporting axle 56, this positioning axle 56 has a twisting spring 57 thereunder in a twisted state. The triggering device 52, as shown in FIG. 7, is located in an axial hole 58, the tip end of the device 59 is aligned with a sealing top end 61 of the storing barrel 53, which end is preextened into a housing 60 (shown in a sectional way). And an outstretching outlet 62 is provided within the housing 60.

Once the inflating device 40 is in position within a car, when there occurs a violent impact, the interior heavy block 44 will rush backward along the direction of an arrow A (FIG. 6) as a result of its force of inertia, hence the eccentric block 51 will be released from the detention of the stop clip 55 on its end, so that the lower spring 57 will render the eccentric block 51 to rotate in the direction of an arrow B with the central supporting axle 56 being its rotating axis. The eccentrical rotation of the eccenctric block 51 thus will quickly knock the trigger device 52, and render it to rush onto the top end of the storing barrel 53 along the direction of an arrow C (FIG. 7), the tip end 59 thereof is capable of piercing through the sealing end of the storing barrel 53, and gas stored in the barrel 53 thus is going to spill out rapidly and putout from the outlet 62.

Figure 4:
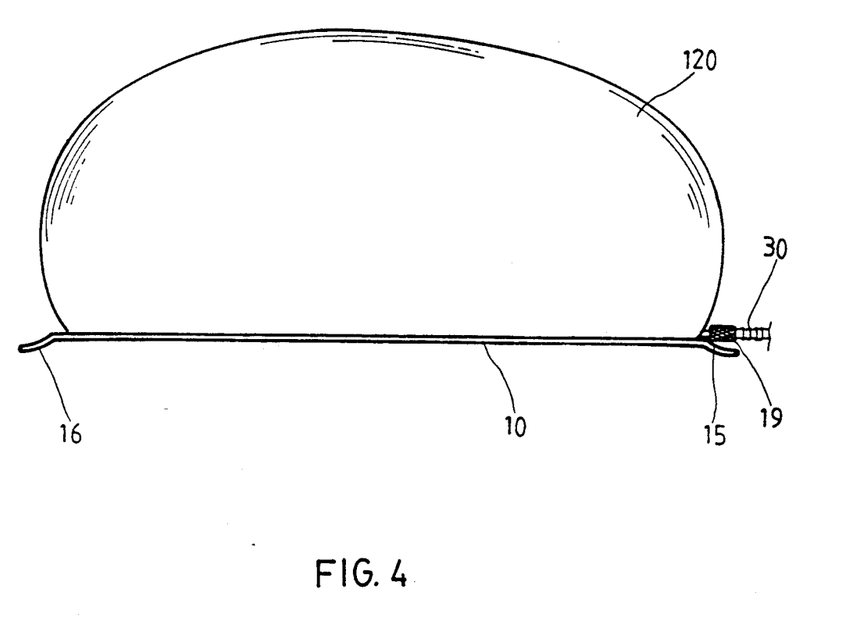
FIG. 4 is similar to FIG. 3, but showing the state wherein the air bag is fully inflated by air.

As shown in FIG. 5, the spilling gas will be transported into the box 10 along the flexible and elastic hose 30 and through the inflator connecting pipe 19, thus the interior of the air bag 12 can be full of gas, and can expand to open the lid 11. Therefore, an air bag 120 as drawed in FIG. 4 is formed.

As to the question that at what degree of impact force the heavy block 44 in the inflating device 40 will start to move, this numeral of degree can be obtained by way of calculation. And further, an adjusting bolt can be provided (not shown), such that the bolt can press and adjust the pressure strip 49 to render the slightly corrugated abutting area 50 to form various degrees of impedimental force to the heavy block 44 by the various degrees of abutting thereof with the block 44, so that the block 44 can start to move when the impact is over a pre-setting value.

Figure 8:
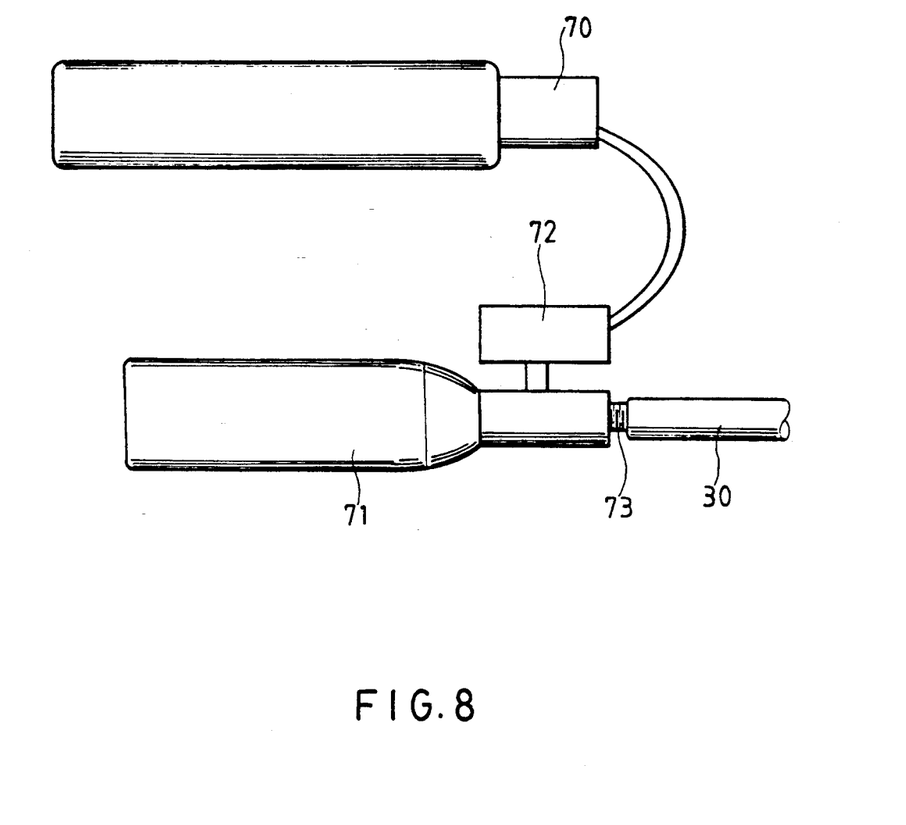
FIG. 8 shows an electrical inflating device which can similarly be used in the present invention.

Such inflating device 40 can of course be substituted by an electronic one, and as shown in FIG. 8, an electronical device can have a pressure detector 70 for connecting with an electro-magnetic valve 72 on the front end of a gas storing barrel 71. When an abnormally high pressure is created in an impact, the electromagnetic valve 72 can be openned to let the gas prestored in the barrel 71 quickly pass through the outlet 73 and into the flexible and elastic hose 30, such can also rapidly inflating the air bag 12 in the box 10.

Figure 9:
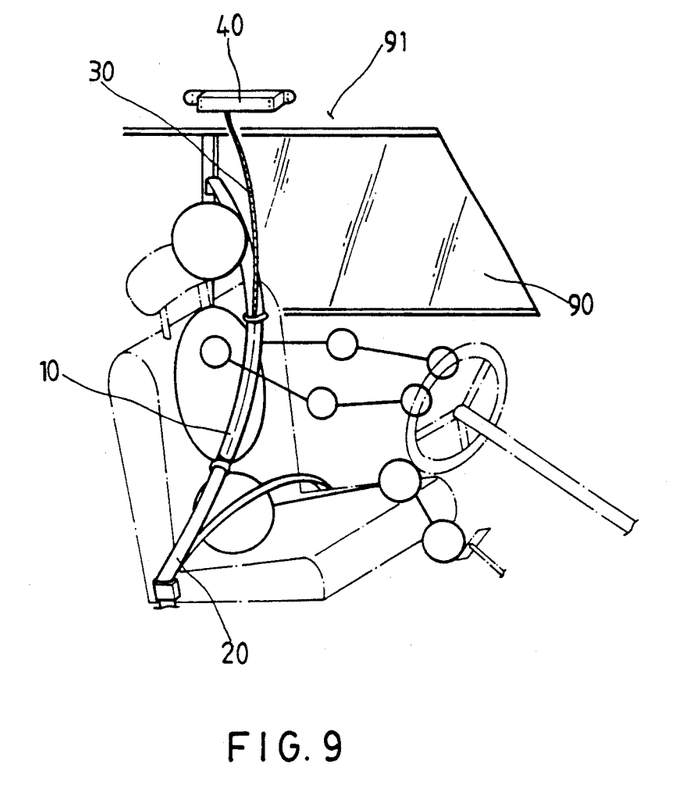
FIG. 9 is a schematic view showing an inflating device combinatively installed in a car.
Figure 10:
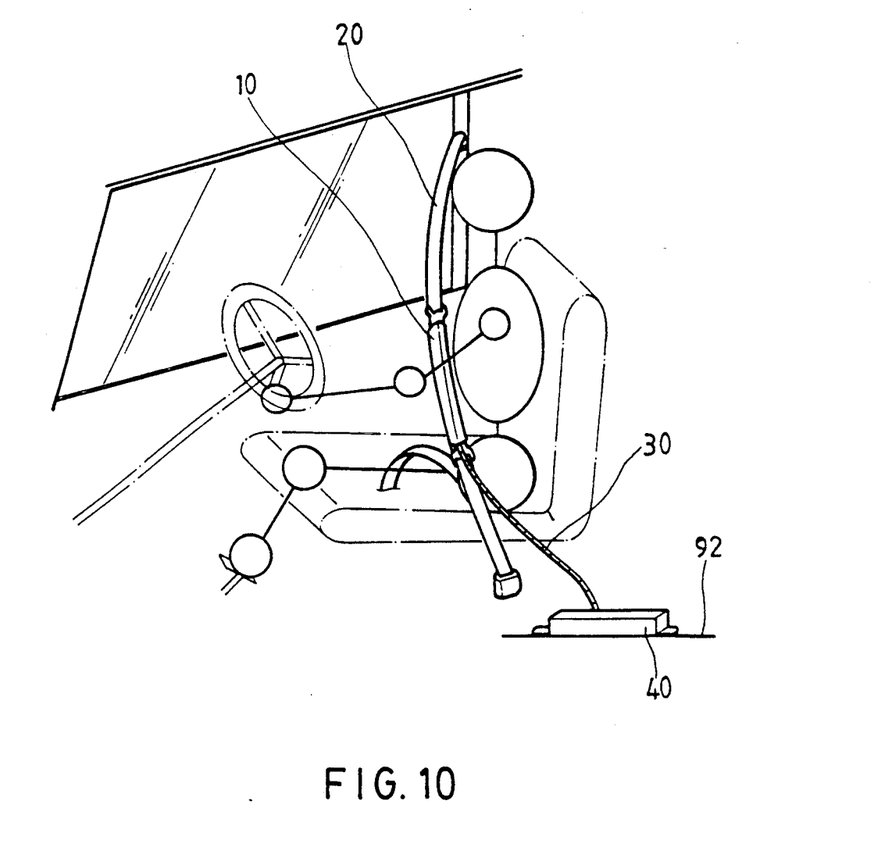
FIG. 10 shows another type of combination of an inflating device in a car.

Referring to FIG. 9, Once the present invention is installed in a car, the whole box 10 can be conveniently installed on the seat belt 20, while the inflating device 40 can be installed inside and on the upper edge 91 of a window 90. A flexible and elastic hose 30 is connecting between the box 10 and the device 40. As shown in FIG. 10, the inflating device 40 can also be installed on the floor 92 inside the car and aside the seat. I.e., on any appropriate position, such as on any seat belt used for front passenger seat, back passenger seats etc., such a buffering safe device is available for installation.

Figure 11:
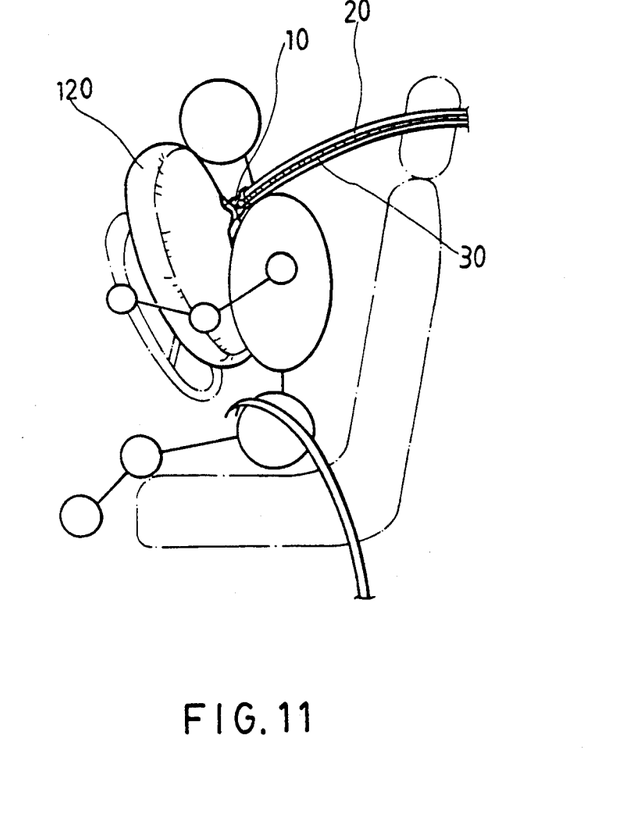
FIG. 11 shows the dynamic situation of the present invention when an impact occurrs.

As shown in FIG. 11, once an acciddence occurs, the passenger subjected to a force will incline forward, while the air bag set on the seat belt 20 will form a cushion layer 120 in front of the human body due to fully inflating. On the connecting end between the flexible and elastic hose 30 and the box 10, a rapid attached and detached connector can naturally be used, which connector can be detached rapidly to render the the gas to release therefore from the air bag rapidly, as can allow the passenger leave the car in a very short time.

In summary, the buffering safe device of the present invention can be conveniently installed onto a seat belt of any type of car; there is no need to use any particular structure of existing parts to complete the installation; the buffering safe device is therefore more convenient as well as more common for use, and therefore is a design of practically usable. My invention is to be construed as including all modifications and variations falling within the scope of the appended claims.

I claim:

1. A buffering safety device of use in a vehicle, suitable for installing on a seat belt in a vehicle, comprising:
    an elongate hollowed box having opposite ends, said box including an openable lid, a folded air bag being included in said box, on both ends of said box there being hook portions for positioning said box on said seat belt;
    an inflator connecting pipe being provided at one of said hook portions at one of said ends of said box, one end of said connecting pipe extending into and connecting with said air bag in said box while the other end extends out of said box;
    an inflating device being provided in said vehicle, the inflating device being connected to said inflator connecting pipe of said box through a flexible and elastic hose, said inflating device releasing a prestored gas when an impact occurs, said gas entering said air bag in said box along said flexible and elastic hose to expand said air bag to establish protection in front of a human body; and wherein
    said inflating device is in the shape of a box, the interior thereof being divided into a left and a right space, a movable heavy block being provided in one of said spaces, there being provided in the other said space in sequence an eccentric block, a triggering device, and a gas barrel;
    said heavy block being provided with a stop clip on one end thereof abutting against a notch provided on said eccentric block;
    said eccentric block being located in position in a twisted state by a central axle and a twisting spring, said triggering device being located in an axial hole, a tip end being aligned with a top end of said barrel, an outlet being provided in said axial hole for connecting with one end of said flexible and elastic hose.

2. A buffering safety device as claimed in claim 1 wherein:
    a pressure strip in said inflating device has a corrugated abutting area abutting against said heavy block, said strip being adjusted by a bolt to adjust the degree of abutment.

* * * * *